US009354418B2

(12) United States Patent
Kolesar (10) Patent No.: US 9,354,418 B2
(45) Date of Patent: May 31, 2016

(54) OPTICAL FIBER ARRAY CONNECTIVITY SYSTEM FOR MULTIPLE ROW TRUNK CABLES AND TERMINALS

(71) Applicant: CommScope, Inc. of North Carolina, Hickory, NC (US)

(72) Inventor: Paul Kolesar, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 37 days.

(21) Appl. No.: 14/096,396

(22) Filed: Dec. 4, 2013

(65) Prior Publication Data

US 2015/0286024 A1 Oct. 8, 2015

Related U.S. Application Data

(62) Division of application No. 13/008,175, filed on Jan. 18, 2011, now Pat. No. 8,622,631.

(60) Provisional application No. 61/296,184, filed on Jan. 19, 2010.

(51) Int. Cl.
*G02B 6/44* (2006.01)
*H04B 10/80* (2013.01)
*G02B 6/38* (2006.01)
*G02B 6/42* (2006.01)

(52) U.S. Cl.
CPC ............ *G02B 6/4472* (2013.01); *G02B 6/4249* (2013.01); *G02B 6/4292* (2013.01); *G02B 6/4471* (2013.01); *H04B 10/801* (2013.01); *G02B 6/3885* (2013.01); *G02B 6/4246* (2013.01)

(58) Field of Classification Search
CPC ........................... G02B 6/4472; G02B 6/4249
See application file for complete search history.

(56) References Cited

U.S. PATENT DOCUMENTS

| 6,498,882 | B1 * | 12/2002 | Buckelew et al. | 385/114 |
|---|---|---|---|---|
| 6,554,483 | B1 * | 4/2003 | Sun et al. | 385/59 |
| 6,758,600 | B2 * | 7/2004 | Del Grosso | G02B 6/4471 385/59 |
| 7,147,383 | B2 | 12/2006 | Sullivan | |
| 7,689,079 | B2 * | 3/2010 | Burnham et al. | 385/51 |
| 8,009,959 | B2 | 8/2011 | Barnes | |
| 8,406,587 | B2 * | 3/2013 | Mudd et al. | 385/31 |

(Continued)

FOREIGN PATENT DOCUMENTS

EP 1180708 2/2002

OTHER PUBLICATIONS

International Search Report and Written Opinion for PCT/US2011/021489, mailed Jun. 7, 2011.

(Continued)

*Primary Examiner* — Rhonda Peace
(74) *Attorney, Agent, or Firm* — Myers Bigel & Sibley, P.A.

(57) ABSTRACT

A fiber optic trunk cable that can be used for connecting multi-channel transceivers includes: a plurality of optical fibers; and first and second terminals attached to opposite ends of the fibers, each of the terminals having an alignment key. The fibers enter the first terminal in an arrangement of 2N rows, wherein N is an integer, and enter the second terminal in an arrangement of 2N rows. Each fiber defines a position in the first terminal that is row-inverted to the position the fiber defines in the second terminal. Such a cable can be employed with appropriate equipment cords and transceivers.

8 Claims, 8 Drawing Sheets

(56) References Cited

U.S. PATENT DOCUMENTS

| | | | |
|---|---|---|---|
| 8,485,737 B2 * | 7/2013 | Kolesar | 385/76 |
| 8,622,631 B2 * | 1/2014 | Kolesar | 385/77 |
| 8,873,967 B2 * | 10/2014 | Barnes et al. | 398/141 |
| 9,020,309 B2 * | 4/2015 | Kolesar | 385/24 |
| 2002/0039468 A1 * | 4/2002 | Lin | 385/17 |
| 2004/0062498 A1 | 4/2004 | Del Grosso | |
| 2005/0207709 A1 * | 9/2005 | Del Grosso | G02B 6/4472 385/71 |
| 2006/0275007 A1 | 12/2006 | Livingston et al. | |
| 2010/0278499 A1 | 11/2010 | Mures | |
| 2010/0296790 A1 | 11/2010 | Cooke | |
| 2010/0296791 A1 | 11/2010 | Makrides-Saravanos | |
| 2010/0322554 A1 * | 12/2010 | Barnes et al. | 385/24 |
| 2010/0322562 A1 | 12/2010 | Barnes | |
| 2010/0322579 A1 | 12/2010 | Cooke | |
| 2010/0322583 A1 | 12/2010 | Cooke | |
| 2011/0103803 A1 * | 5/2011 | Kolesar | 398/142 |
| 2011/0176779 A1 * | 7/2011 | Kolesar | 385/77 |
| 2011/0274400 A1 * | 11/2011 | Mudd et al. | 385/134 |
| 2015/0286024 A1 * | 10/2015 | Kolesar | G02B 6/4249 385/77 |

OTHER PUBLICATIONS

Invitation to Pay Additional Fees for PCT/US2011/021489, mailed Apr. 6, 2011.

Written Opinion of the International Preliminary Examining Authority for PCT/US2011/021489, mailed Apr. 4, 2012.

* cited by examiner

OPTICAL FIBER ARRAY CONNECTIVITY SYSTEM FOR MULTIPLE ROW TRUNK CABLES AND TERMINALS

RELATED APPLICATION

This application is a divisional application of U.S. patent application Ser. No. 13/008,175, filed Jan. 18, 2011, which claims priority from U.S. Provisional Patent Application Ser. No. 61/296,184, filed Jan. 19, 2010, the disclosure of which is hereby incorporated herein in its entirety.

FIELD OF THE INVENTION

The present invention is directed generally to fiber optic multi-strand cables, connectors, adapters, and patching systems.

BACKGROUND OF THE INVENTION

Optical fibers, both multi-mode and single mode, are commonly used for the transmission of signals of all sorts, including communication and data signals. Communications systems often transmit signals between transceivers (i.e., devices that can both transmit and receive optical signals) via different fibers in each direction. More specifically, one or more fibers will transmit signals from the first transceiver to the second, and one or more of the other fibers will transmit signals from the second transceiver to the first. In this manner, optical signals are not traveling along the same fiber in different directions.

This arrangement would be fairly simple to organize for two transceiver devices that are permanently optically connected, but in practice transceivers are typically connected through a much larger network of optical fibers, connectors and patch panels. For example, a common optical system includes multiple transceivers at one end, 2-fiber patch cords that are connected to the transceivers and to duplex adapters mounted on a patch panel, a fan-out transition device connected to the duplex adapters that connects to a multi-strand fiber optic trunk cable (12 fibers per cable is common, and the fiber strands may be in ribbon form) via an array adapter, a second fan-out transition device connected to the opposite end of the optic trunk cable via a second array adapter, and corresponding transceivers connected via 2-fiber patch cords to the second fan-out transition device through duplex adapters. Thus, it is important to be able to track individual optical fibers in the various devices and cables between the transceivers in order to ensure that the individual transceivers are connected as desired.

To ensure intermateability of cabling components and signal polarity, standards have been created to define arrangements of fibers, cables, adapters and connectors. For example, one such standard for array connectors, TIA-604-5B, is directed to multi-fiber push-on (MPO) fiber optic connector intermateability. Another standard, TIA 568-B.3 with addendum No. 7 written by committee TR-42, is directed to maintaining optical fiber polarity with systems using array connectors and adapters, including MPOs. Systems built using these methods utilize fiber optic cables, adapters, transition devices and patch cords that are typically partially or completely unique to one of these methods.

In some instances, transceivers may utilize less than all of the fibers of the trunk cable. For example, a transceiver may have only four channels, each of which has a "transmit" fiber and a "receive" fiber. Commonly, two such transceivers would utilize the outer four fibers on either end of a 12-fiber trunk cable; i.e., the transmit fibers would use fibers 1-4 of the trunk cable, and the receive fibers would use fibers 9-12 of the trunk cable. Thus, the devices would occupy only eight of the 12 fibers of a 12-fiber trunk cable, which would result in inefficient use of the trunk cable. However, adding more transceivers onto the trunk cable in order to utilize all of the trunk cable fibers may complicate the connection scheme. One approach to this problem is proposed in co-assigned and co-pending U.S. patent application Ser. No. 12/608,230, which provides schemes and accompanying devices that enable multiple transceivers having fewer than 12 fibers to connect with proper polarity via an available 12-fiber trunk cable.

A different situation may also arise when a transceiver has more than 6 channels (12 fibers); for example, each of a pair of transceivers may have 12, 18 or even 24 channels. It may also be desirable to provide schemes and devices that enable such transceiver to utilize 12-fiber trunk cables.

SUMMARY OF THE INVENTION

As a first aspect, embodiments of the present invention are directed to a fiber optic trunk cable that can be used for connecting multi-channel transceivers. The trunk cable comprises: a plurality of optical fibers; and first and second terminals attached to opposite ends of the fibers, each of the terminals having an alignment key. The fibers enter the first terminal in an arrangement of 2N rows, wherein N is an integer, and enter the second terminal in an arrangement of 2N rows. Each fiber defines a position in the first terminal with respect to the alignment key that is laterally transposed and row-inverted to the position the fiber defines in the second terminal.

As a second aspect, embodiments of the present invention are directed to a fiber optic fan-out, comprising: a plurality of optical fibers; a first terminal attached to one end of the fibers, wherein the fibers are arranged in 2N rows, wherein N is an integer; and a plurality of second terminals attached to the opposite ends of the fibers, the fibers being attached in pairs, said pairs being formed by association of adjacent fibers within each row of the first terminal, and said pairs arranged in succession along the rows.

As a third aspect, embodiments of the present invention are directed to a fiber optic fan-out, comprising: a plurality of optical fibers; a first terminal attached to one end of the fibers, wherein the fibers are arranged in 2N rows, wherein N is an integer, the terminal having an alignment key; and 2N second terminals each with an alignment key, said second terminals attached to the opposite end of the fiber rows, the fibers being attached to the second terminals in single rows, the order of the second terminals being in succession to the rows of the first terminal, the alignment keys all facing in the same direction.

As a fourth aspect, embodiments of the present invention are directed to a fiber optic fan-out, comprising: a plurality of optical fibers; a first terminal attached to one end of the fibers, wherein the fibers are arranged in 2N rows, wherein N is an integer, said terminal having an alignment key; and N second terminals each with an alignment key, said second terminals attached to the opposite end of the fiber rows, the fibers being attached to the second terminals in two rows and retaining their consecutive relationship established at the first terminal, the order of the second terminals being in succession to the rows of the first terminal, the alignment keys of the second terminals all facing the same direction.

As a fifth aspect, embodiments of the present invention are directed to a fiber optic system, comprising first and second fan-outs, a trunk cable, and connector-mating adapters. The first and second fan-outs comprise, respectively, first and second transceiver-side terminals with optional adapters. The first fan-out further comprises a first plurality of optical fibers attached to the first terminal, and the second fan-out comprises a second plurality of optical fibers attached to the second terminal. The first and second fan-outs further comprise first and second trunk cable-mating terminals, each of said terminals having an alignment key. The trunk cable comprises: a third plurality of optical fibers; and first and second trunk cable terminals attached to opposite ends of the third plurality of fibers, each of the first and second trunk cable terminals having an alignment key. The third fibers enter the first trunk cable terminal in an arrangement of 2N rows, wherein N is an integer. The third fibers enter the second trunk cable terminal in an arrangement of 2N rows. Each third fiber defines a position in the first trunk cable terminal with respect to the key that is laterally transposed and row-inverted (relative to a line parallel to and bisecting the rows) to the position the third fiber defines in the second trunk cable terminal. The first trunk cable terminal is connected with the first trunk cable-mating terminal, and wherein the second trunk cable terminal is connected with the second trunk cable-mating terminal, each connection mated with an adapter having aligned keyways.

BRIEF DESCRIPTION OF THE FIGURES

In FIG. 6, the fan-out is shown in an "alpha" orientation.

DETAILED DESCRIPTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout, and the thickness of lines, layers and regions may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
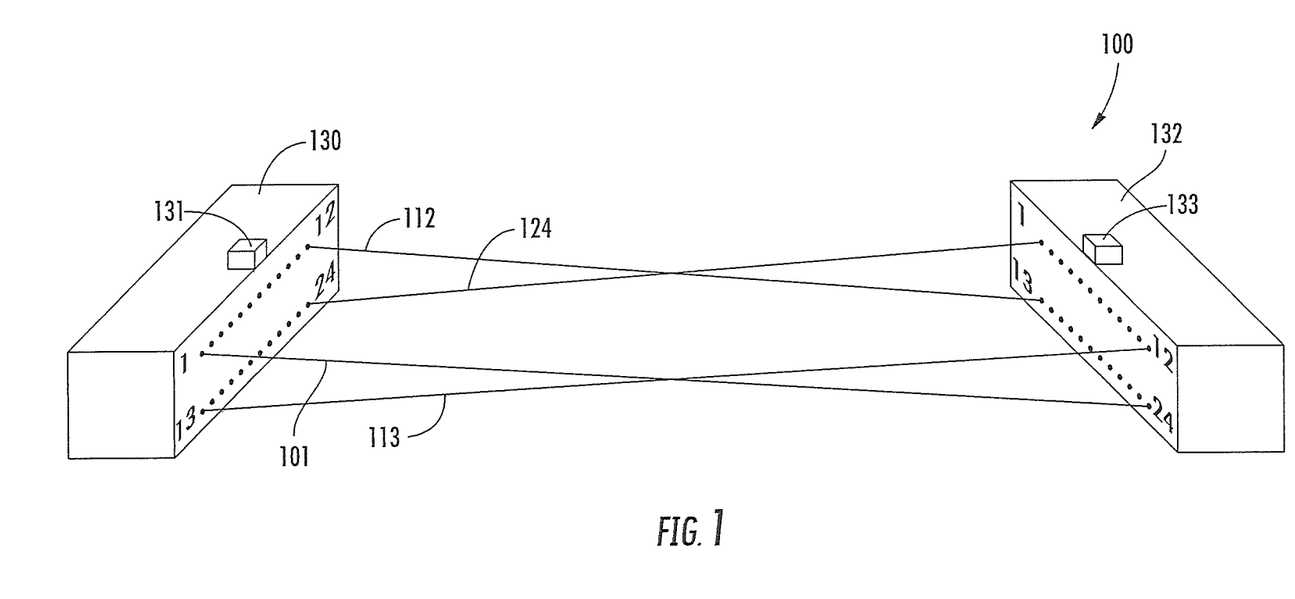
FIG. 1 is a schematic view of a 24-fiber trunk cable having fibers arranged in two rows according to embodiments of the present invention, wherein only the endmost fibers in the upper and lower rows are shown for clarity.

Referring now to the drawings, an exemplary 24-fiber trunk cable, designated broadly at 100, is illustrated in FIG. 1. The trunk cable 100 includes twenty-four optical fibers (four of which, fibers 101, 112, 113 and 124, are shown in FIG. 1), a terminal 130 at one end of the fibers 101-124, and a terminal 132 at the opposite end of the fibers. Each of the terminals has a respective projection, or "key" 131, 133 on one side thereof to enable the trunk cable 100 to be aligned and oriented properly with another cable, cord or component. As can be seen in FIG. 1, the fibers are arranged such that they form two rows of twelve fibers each at each terminal 130, 132, with the fibers entering one terminal 130, 132 in the top row entering the other terminal 132, 130 in the bottom row at laterally transposed positions relative to a vertical plane that bisects the terminals 130, 132. For example, using the convention that the top row has positions 1-12 from left to right, as viewed from the direction the fibers enter the terminal, and that the bottom row has positions 13-24 from left to right from the same vantage point, the fiber 101 extends between position 1 of terminal 130 (the leftmost position of the top row) and position 24 of terminal 132 (the rightmost position of the bottom row). Similarly, fiber 113 extends between position 13 of terminal 130 (the leftmost position of the bottom row) and position 12 of terminal 132 (the rightmost position of the top row). On the opposite side of the cable 100, fiber 112 extends between position 12 of terminal 130 and position 13 of terminal 132, and fiber 124 extends between position 24 of terminal 130 and position 1 of terminal 132. The fibers that are not shown follow the pattern established by the illustrated fibers. The keys 131, 133 shown on the top surface establish the orientation of the terminals 130, 132. Fibers attached to the upper row of the terminal 130 are also attached to the lower row of the terminal 132. For fibers routed as shown, the oppositely facing terminals produce a lateral transposition of the fiber locations, such that fibers attached to the leftmost positions on one terminal are attached to the rightmost positions on the other terminal (the "right" and "left" positions being from a vantage point of the fibers as they enter the terminal). The result is that the group of fibers forms mirror images about a vertical plane extending normal to the rows formed by the fibers in the terminals 130, 132 extending through the keys 131, 133.

As can be seen from this explanation and illustration, the cable 100 is "row-inverted", in that each fiber occupies a position at one terminal in one row (i.e., top or bottom row) and at the other terminal occupies the position in the opposite row (i.e., bottom or top) that is laterally transposed (e.g. leftmost to rightmost) as seen when viewed from the direction where the fibers enter the terminals. This pattern can be extended to terminals with arbitrary even numbers of rows. For the 2-row, 24-fiber cable 100, Table 1 shows the routing arrangement.

TABLE 1

| Fiber No. | Position at Terminal 130 | Position at Terminal 132 |
|---|---|---|
| 101 | 1 | 24 |
| 102 | 2 | 23 |
| 103 | 3 | 22 |

TABLE 1-continued

| Fiber No. | Position at Terminal 130 | Position at Terminal 132 |
|---|---|---|
| 104 | 4 | 21 |
| 105 | 5 | 20 |
| 106 | 6 | 19 |
| 107 | 7 | 18 |
| 108 | 8 | 17 |
| 109 | 9 | 16 |
| 110 | 10 | 15 |
| 111 | 11 | 14 |
| 112 | 12 | 13 |
| 113 | 13 | 12 |
| 114 | 14 | 11 |
| 115 | 15 | 10 |
| 116 | 16 | 9 |
| 117 | 17 | 8 |
| 118 | 18 | 7 |
| 119 | 19 | 6 |
| 120 | 20 | 5 |
| 121 | 21 | 4 |
| 122 | 22 | 3 |
| 123 | 23 | 2 |
| 124 | 24 | 1 |

Figure 2:
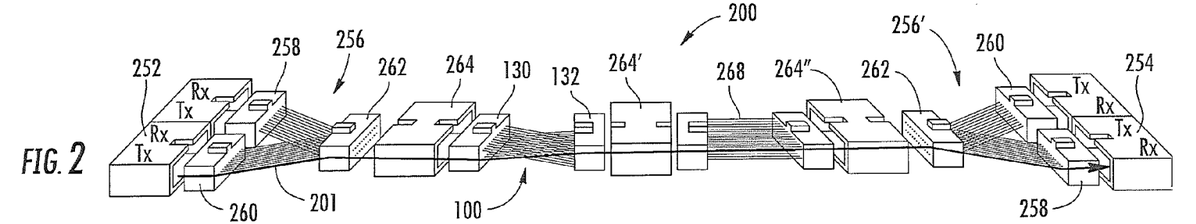
FIG. 2 is a schematic view of a system employing the trunk cable of FIG. 1, wherein the transceivers employ fewer than 7 channels.

The trunk cable 100 can be used in fiber optic systems for connecting transceivers. One exemplary system is shown in FIG. 2 and designated 200. A transceiver 252 having separate receive and transmit portions Rx, Tx of six ports each on each side thereof is located at one end of the system 200, and a similarly configured transceiver 254 is located at the opposite side of the system 200. This configuration denotes a transceiver with six or fewer lanes (channels). Two identical equipment cords 256, 256' are interconnected with the transceivers 252, 254. The equipment cords 256, 256' each include a terminal 262 that receives twenty-four fibers arranged in two rows, with the fibers of the upper row being routed to a terminal 258 and the fibers of the lower row being routed to a terminal 260. An "aligned-keyway" adapter 264 connects the terminal 262 of the equipment cord 256 to the terminal 130 of the trunk cable 100. The opposite terminal 132 of the trunk cable 100 is connected with another adapter 264', which is attached to one end of an optional twenty-four fiber extension cable 268. The opposite end of the extension cable 268 is connected to a third adapter 264", which is connected with the terminal 262 of the equipment cord 256'. Notably, the "keys" for each of the equipment cords 256, 256', the trunk cable 100 and the equipment cable 268 are oriented to be "up" for alignment with the aligned keyways of the adapters.

The connectivity of the system can be demonstrated by following a signal from a transmitter Tx of the transceiver 252 to a receiver Rx of the transceiver 254. Beginning on the left side of FIG. 2, a signal (represented by a bold line) is transmitted from the left endmost port of the transmitter Tx to the endmost fiber 201 of terminal 260 of the equipment cord 256. The signal proceeds to the endmost port of the bottom row of the terminal 262 of the equipment cord 256, then through the endmost port of the bottom row of the terminal 130 and to the fiber 113 of the trunk cable 100 (corresponding to position 13 of FIG. 1). The fiber 113 rises to the upper row of the terminal 132 (i.e., to position 12 of FIG. 1), where it then passes to the extension cable 268 and into the right endmost fiber of the upper row of the equipment cord 256'. From there the signal passes through the right endmost port of the terminal 258 of the equipment cord 256' and into the right endmost port of the receiver Rx of the transceiver 254. Similar paths can be traced for the other fibers connecting the transceivers 252, 254. Thus, it can be seen that the equipment cords 256, 256' can be identical and can be used to interconnect the transceivers 252, 254 in a "key-up to key-up" manner and retain functional polarity.

Figure 3:
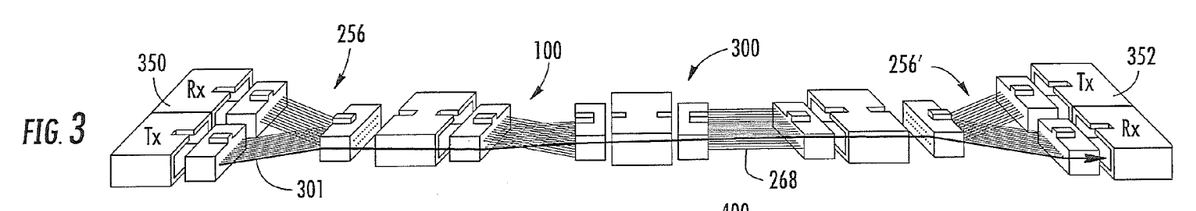
FIG. 3 is a schematic view of a system employing the trunk cable of FIG. 1, wherein the transceivers employ more than 6 channels, and wherein the receive and transmit portions of the transceivers are separated in side-by-side relationship and receive separate terminals from the equipment cords.

Referring now to FIG. 3, a system 300 is shown therein that includes two transceivers 350, 352 that have more than six channels, such that each transceiver 350, 352 has one transmitter portion Tx and one receiver portion Rx having twelve ports each. The system also includes equipment cords 256, 256', a trunk cable 100, and an extension cable 268. A signal sent through fiber 301 can be traced from transmitter Tx in transceiver 350 to receiver Rx in transceiver 352 by following the same path through the equipment cord 256, the trunk cable 100, the extension cable 268, and the equipment cord 256' as described above for a signal through fiber 201.

Figure 4:
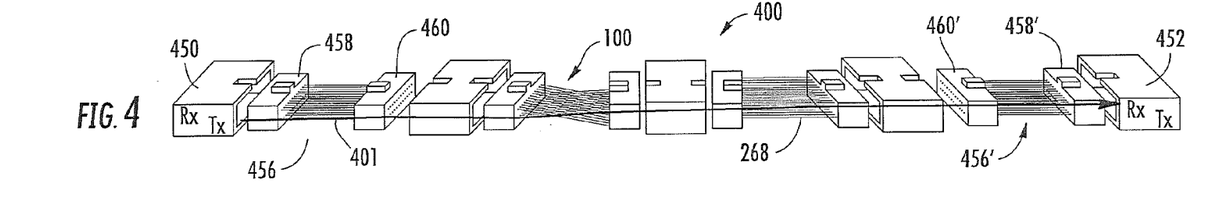
FIG. 4 is a schematic view of a system employing the trunk cable of FIG. 1, wherein the transceivers employ more than 6 channels, and wherein the receive and transmit portions of the transceivers are arranged in two rows within a single terminal.

FIG. 4 illustrates a system 400 in which transceivers 450, 452 are arranged with their twelve ports for receivers Rx positioned in a row above their twelve ports for transmitters Tx as a single unit, thereby requiring only a single terminal for connection. In this instance each of two equipment cords 456, 456' has only one terminal 458 that connects with its respective transceiver 450, 452, with the two rows of fibers each being routed directly from the terminal 460 to the terminal 458 and remaining in their respective (upper or lower) positions. In this arrangement, a signal traveling through fiber 401 can be traced from lower row of fibers (connected to a transmitter Tx) of the transceiver 450 to the upper row of fibers (connected to a receiver Rx) of the transceiver 452 by passing through the equipment cord 456, the trunk cable 100 (where the signal passes from the bottom row to the top row), the extension cord 268 and the equipment cord 456'.

Figure 5:
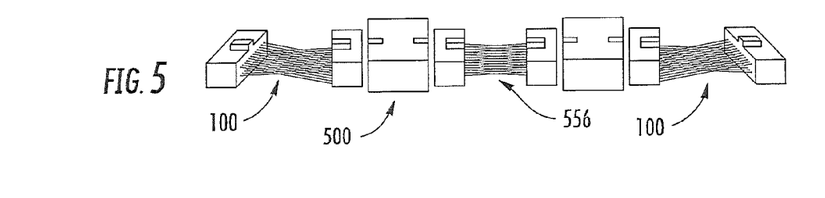
FIG. 5 is a schematic view of a portion of a system employing two trunk cables of FIG. 1 as well as an inverted-row patch cord.

FIG. 5 demonstrates that, in a system 500 in which multiple trunk cables 100 are employed in a cross-connected arrangement, row-inverted patch cords 556 with fiber routing identical to that of the trunk cables can be used to maintain proper polarity.

Figure 6:
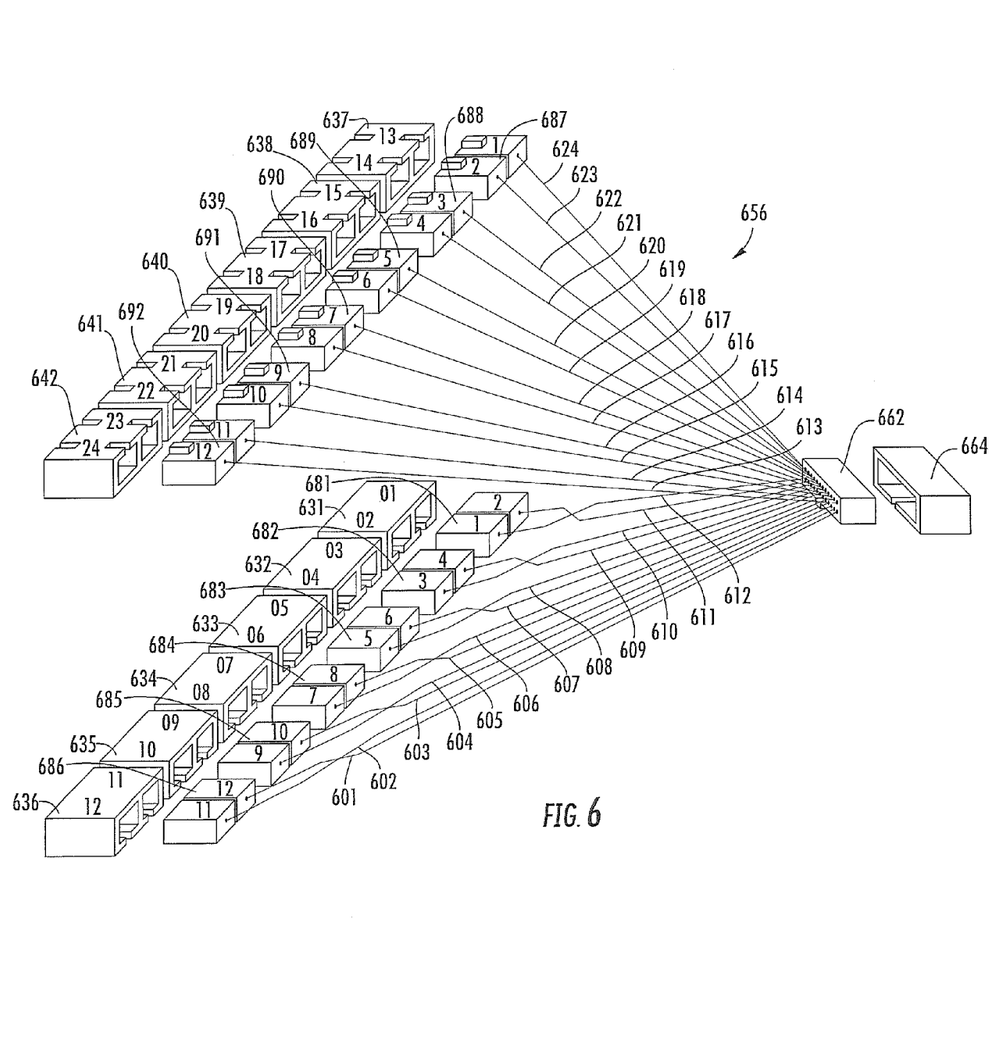
FIG. 6 is an enlarged view of multi-2-fiber fan-out and associated adapters for one or more transceivers in which the transmit and receive ports are arranged in individual pairs, and wherein the fibers are arranged in two rows at the terminal mating with a trunk cable.
Figure 7:
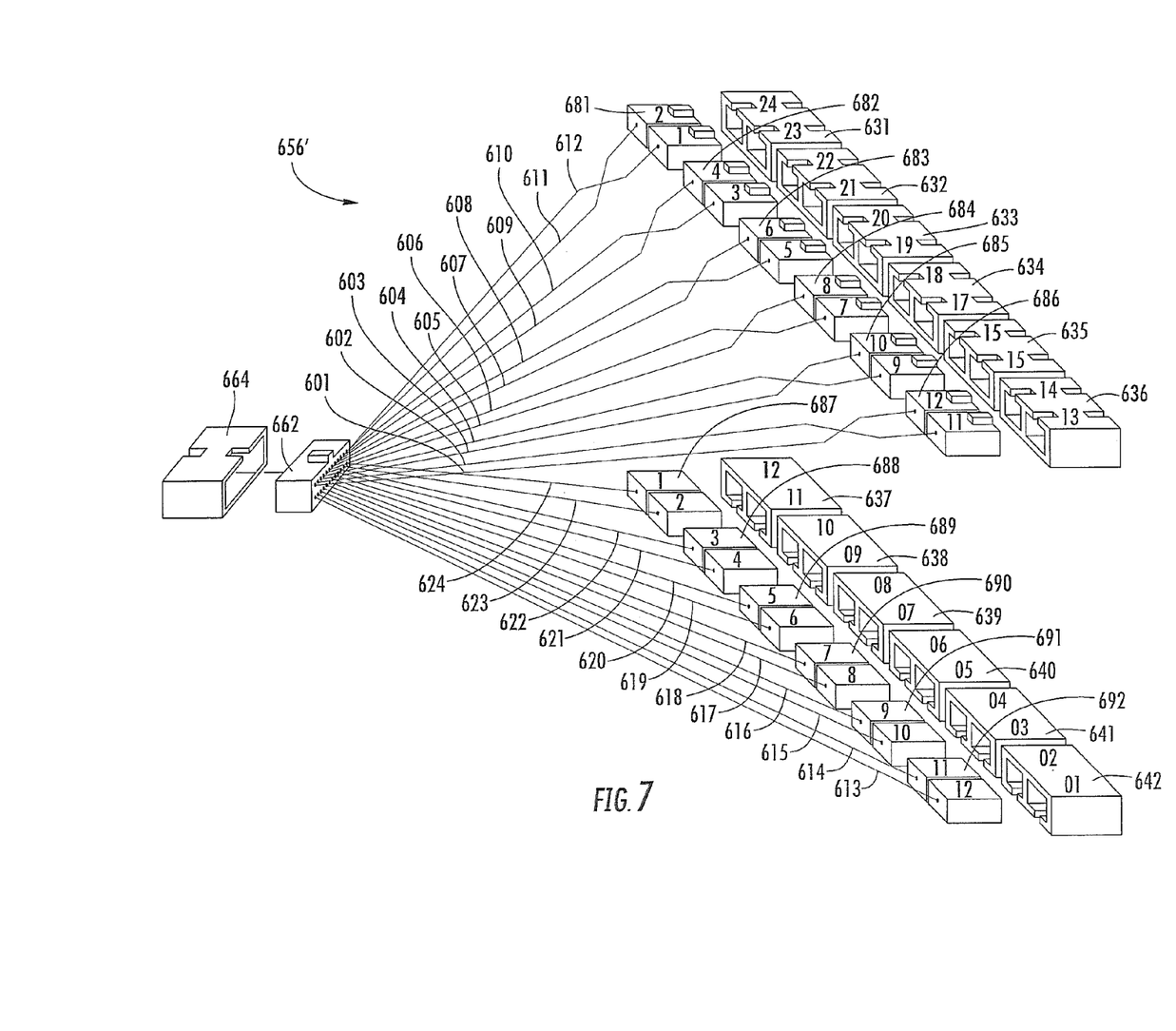
FIG. 7 is an enlarged view of the fan-out of FIG. 6 shown in a "beta" orientation.

FIGS. 6 and 7 are enlarged views of a multi-2-fiber fan-out and associated adapters 656, which includes a terminal 662, twenty-four fibers 601-624 arranged in upper and lower rows, and twelve 2-fiber terminals 681-692 that mate each with optional 2-fiber adapters 631-642 (note that FIG. 6 shows the "alpha" orientation of the cord 656 and FIG. 7 shows the inverted "beta" orientation 656'). Notably, fibers 613-624 of the upper row (wherein the "upper" row is designated based on the alpha orientation of FIG. 6, wherein the key is "down") are routed directly from the ports 13-24 of the terminal 662 to the ports numbered 12-1 of terminals 687-692 that face adapter ports numbered 24-13 respectively. However, the fibers 601-612 of the lower row are routed such that each fiber crosses over an adjacent paired fiber to accommodate the keyway-down orientation of the adapters 631-636. (The adapters are oriented with keyways down to facilitate finger access to terminal latch features that are not shown.) For example, fiber 601 crosses over fiber 602, such that fiber 601 is routed from port 1 of the terminal 662 to port 12 of the terminal 686 that faces port 11 of adapter 636, and fiber 602 is routed from port 2 of the terminal 662 to port 11 of the terminal 686 that faces port 12 of adapter 636. The same crossing over of adjacent paired fibers is followed for all of the fibers of the lower row as they are routed to the terminals 681-685. FIG. 7 shows that the same arrangement is maintained when the fan-out 656 is inverted to the beta orientation. It should be noted that while the assemblies shown in FIGS. 6 and 7 depict fan-outs mating to adapters, they also illustrate the connectivity of equipment cords in the case where the 2-fiber adapters are instead transceivers. Thus the term "fan-out" is meant to apply to both transition assemblies contained within cassettes as well as equipment cords.

Figure 8:
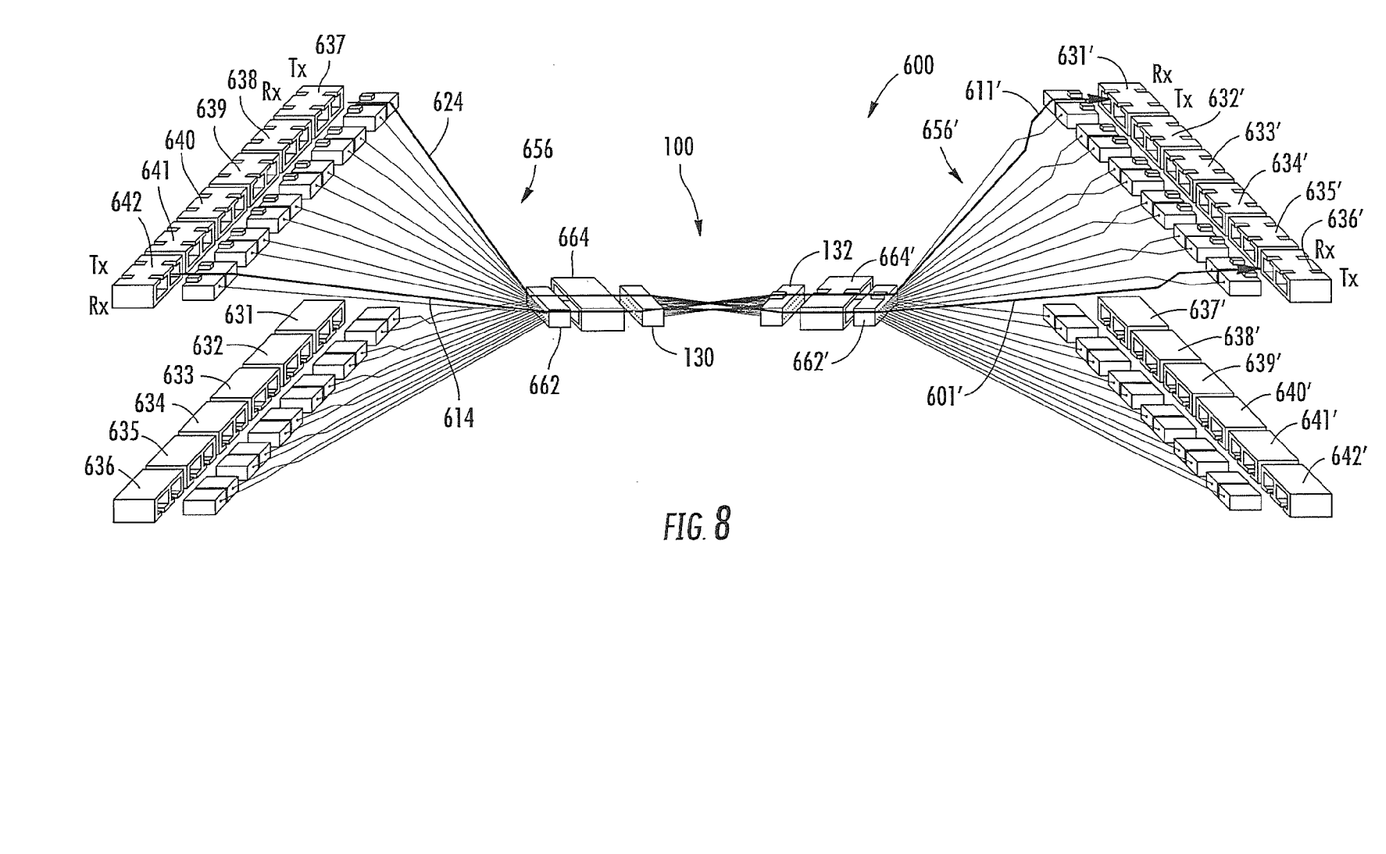
FIG. 8 is a schematic view of a system employing the trunk cable of FIG. 1 and the fan-outs of FIGS. 6 and 7.

FIG. 8 shows a system 600 that utilizes two fan-outs 656, 656'. A trunk cable 100 is connected between each fan-out 656, one of which (fan-out 656, on the left side of FIG. 8) is shown in the alpha orientation and the other of which (fan-out 656', on the right side of FIG. 8) is shown in the beta orientation. For clarity, the trunk cable 100 is shown in a twisted configuration such that the key of terminal 130 faces down. Each of the alpha-side adapters 631-642 is assigned a transmit port Tx and a receive port Rx, as are the beta-side adapters 631'-642', as they would be associated with 2-fiber transceivers via 2-fiber patch cords both of which are not shown.

Connectivity of the system 600 can be verified by tracking a signal from the alpha-side port 13 of adapter 637, which travels on fiber 624 of the alpha fan-out 656 to the endmost port 24 of the upper row of the terminal 662. The signal then travels in the fiber 113 from port 13 of the terminal 130 of the trunk cable 100 to port 12 of the terminal 132 (which is shown in as the endmost port of the upper row in FIG. 8). The signal then travels in fiber 601' of the beta fan-out 656' to the port 14 of the beta-side adapter 636', where it is received in the proper Rx port. As another example, a signal transmitted from the Tx port 23 of the adapter 642 is routed in fiber 614 of the cord 656 to the second nearest upper port 14 of terminal 662, then to the second farthest upper port of terminal 662' of fan-out 656', then to the endmost port 24 (an Rx port) of the adapter 631'. Similar tracking can be performed for the other fibers of the system 600.

Figure 9:
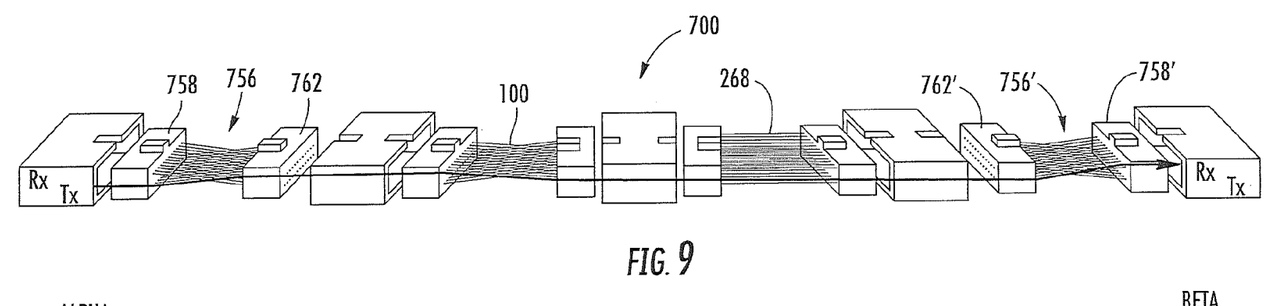
FIG. 9 is a schematic view of a system employing the trunk cable of FIG. 1 similar to that shown in FIG. 4, but wherein the equipment cords are row-inverted.

FIG. 9 illustrates a system 700 which is like that of the system 400 of FIG. 4, but which utilizes equipment cords 756, 756' that are row-inverted. In other words, a fiber is routed from the upper row of one terminal 758 to the lower row of the other terminal 762 and vice versa. Notably, in the system 700, each of the trunk cable 100 and the two equipment cords 756, 756' are row-inverted, which may render it simpler for the installer/customer to keep track of connectivity (because both the equipment cords and the trunk cable are row-inverted).

Figure 10:
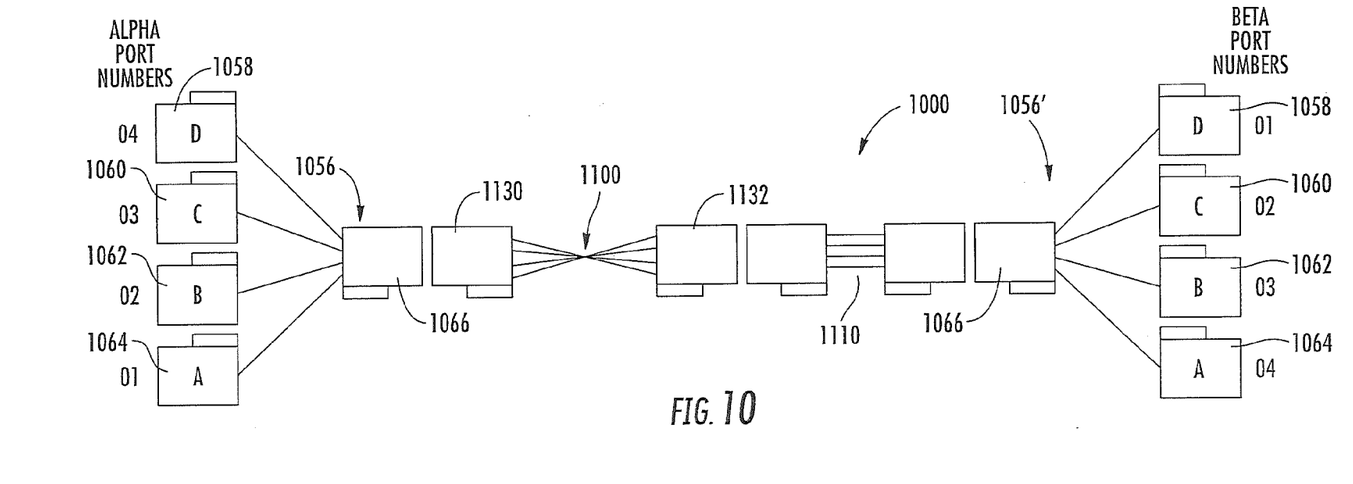
FIG. 10 is a schematic side view of a system having a trunk cable with fibers arranged in four rows, wherein each row serves a separate transceiver and the adapters between terminals are not shown.
Figure 11:
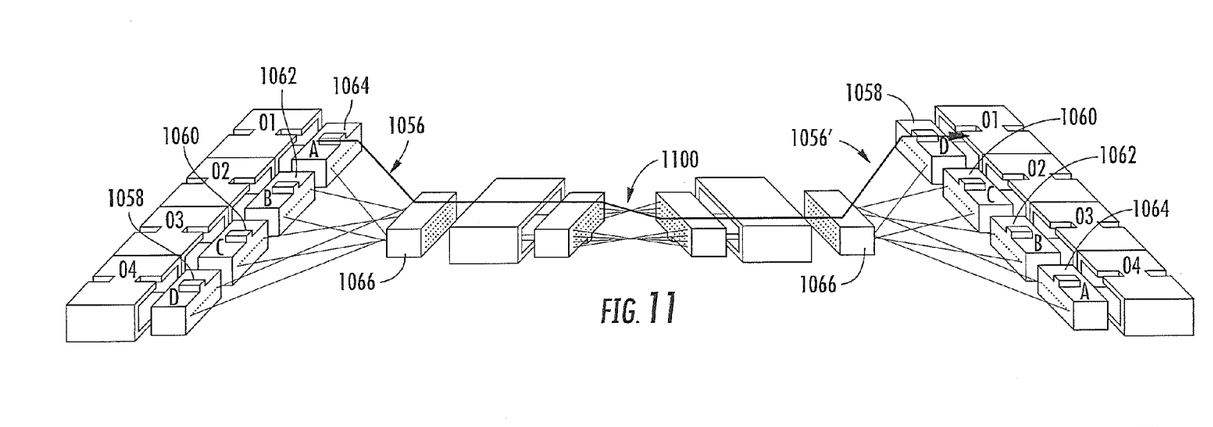
FIG. 11 is a schematic perspective view of the system of the system of FIG. 10, wherein only the endmost fibers in each row are shown for clarity, adapters are shown, and the trunk extension cable is not shown.

FIGS. 10 and 11 illustrate a system 1000 that demonstrates that the principles discussed above can be applied to systems in which more than two rows of fibers are employed. For simplicity in FIG. 10 each row of fibers is represented by a single line and the adapters are not shown. For simplicity in FIG. 11 the extension cable 1110 is not shown to provide space to show the adapters and all ports on the terminals. In the description that follows, extension cable 1110 is ignored. A trunk cable 1100 has four rows of fibers that are row-inverted between terminal 1130 and 1132. Array fan-outs 1056, 1056' each include four terminals 1058, 1060, 1062, 1064 on one end, each of which has a single row of fibers, and a single terminal 1066 that has four rows of twelve fibers each and connects to one end of the trunk cable 1100. For simplicity in FIGS. 10 and 11, both fan-outs 1056, 1056' are shown in an alpha orientation, in which the terminals 1058, 1060, 1062, 1064 have key features on top. As can be seen in FIG. 11, a signal from alpha port 1 connected to terminal 1064 of fan-out 1056 is routed to the terminal 1058 and beta port 1 of fan-out 1056'; similarly, a signal from alpha port 4 connected to terminal 1058 of fan-out 1056 is routed to the terminal 1064 and beta port 4 of fan-out 1056'. Thus port numbers on the left connect to like port numbers on the right.

Figure 12:
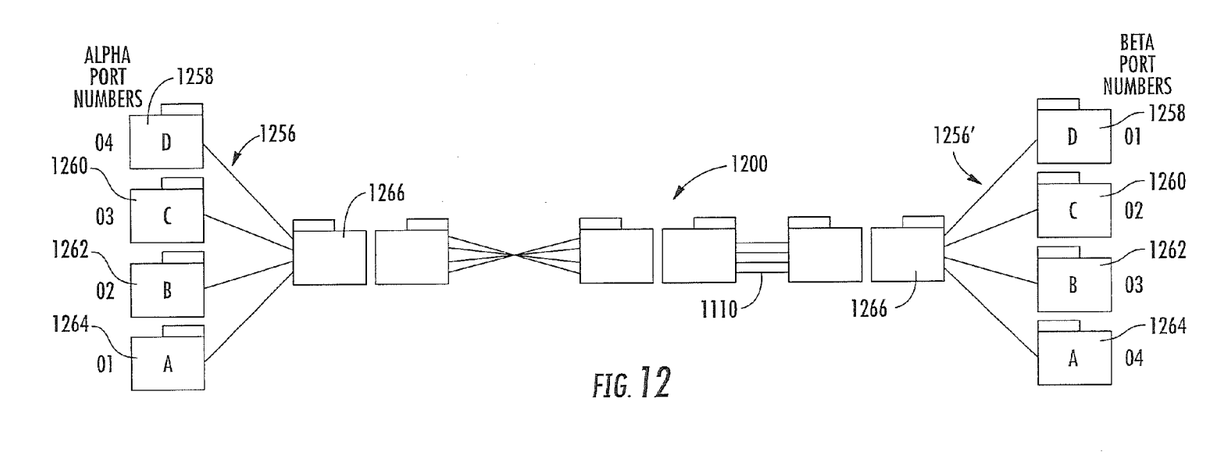
FIG. 12 is a schematic side view of a system similar to that shown in FIG. 10, but with the key orientations of the trunk-side terminals of the fan-outs reversed.
Figure 13:
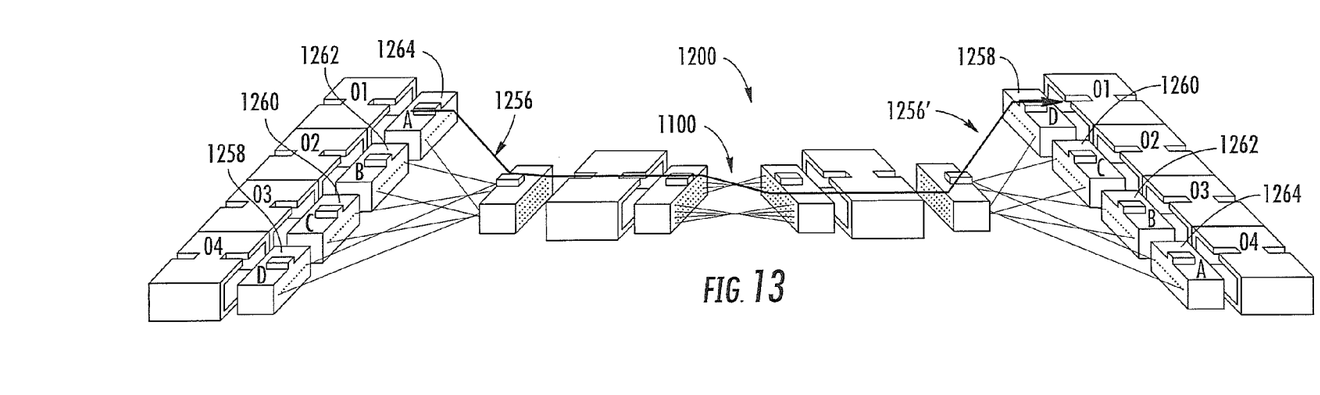
FIG. 13 is a schematic perspective view of the system of FIG. 12, wherein only the endmost fibers in each row are shown for clarity, adapters are shown, and the trunk extension cable is not shown.

FIGS. 12 and 13 illustrate a system 1200 that is similar to the system 1000, with the exception that the orientation of the keys of the terminals 1266 of the fan-outs 1256, 1256' is reversed (i.e. shown on top of terminals 1266) to the key orientation shown for analogous terminals 1066 of FIGS. 10 and 11.

Figure 14:
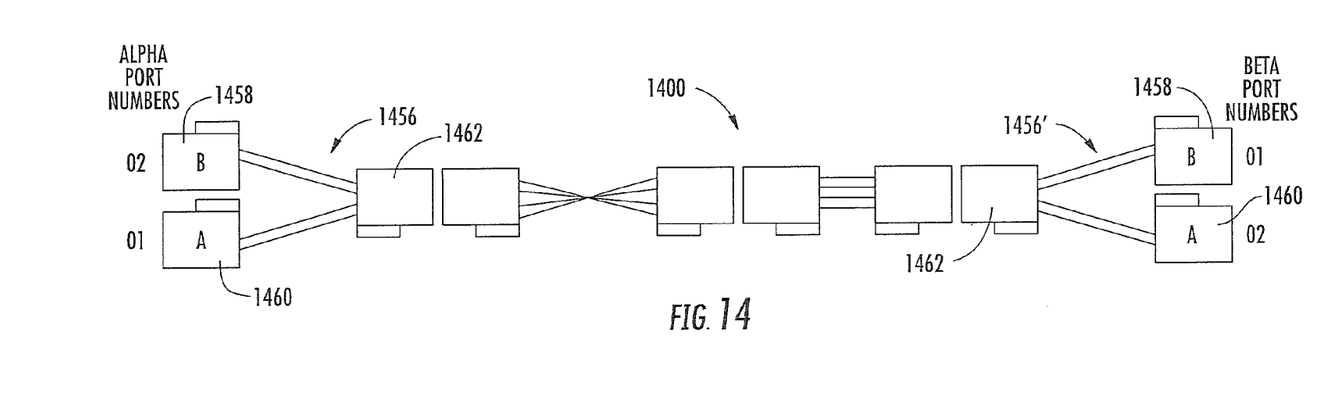
FIG. 14 is a schematic side view of a system like that of FIG. 10, wherein two rows of fibers serve each of the transceivers.

FIG. 14 illustrates a system 1400 in which fan-outs 1456, 1456' each have two terminals 1458, 1460 that each receive two rows of fibers from the terminal 1462. Tracking of signals through the fibers of the system 1400 shows that a signal originating in the top row of the terminal 1458 of fan-out 1456 (i.e. alpha port number 02) is received in the bottom row of the terminal 1460 of fan-out 1456' (i.e. beta port number 02).

Those skilled in this art will appreciate that systems other than those illustrated herein may be employed. For example, extension cables may be added or omitted. The numbers of fibers and/or rows of fibers within trunk cables and equipment cords may vary. For example, a trunk cable, equipment cord or fan-out may have 2N rows of fibers in its terminals, wherein N is an integer (e.g., 1, 2, 3, 4, etc.). The style and type of MPO connector may vary. Other modifications will be apparent to those of skill in this art.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A fiber optic fan-out, comprising:
  an even number of optical fibers;
  a first terminal attached to one end of the fibers, wherein the fibers are arranged in 2N rows, wherein N is an integer;
  a plurality of second terminals attached to the opposite ends of the fibers, the fibers being attached in pairs, said pairs formed by association of adjacent fibers within each row of the first terminal, said pairs arranged in succession along the rows; wherein the number of fibers in each row of the first terminal is equal to the number of second terminals.

2. The fan-out defined in claim 1, wherein N=1.

3. The fan-out defined in claim 2, wherein the plurality of fibers is 24 fibers.

4. A fiber optic fan-out, comprising:
  a plurality of optical fibers;
  a first terminal attached to one end of the fibers, wherein the fibers are arranged in 2N rows, wherein N is an integer, said terminal having an alignment key;
  and 2N second terminals each with an alignment key, said second terminals attached to the opposite end of the fiber rows, the fibers being attached to the second terminals in single rows and retaining their consecutive relationship established at the first terminal, the order of the second terminals being in succession to the rows of the first terminal, the alignment keys of the second terminals all facing the same direction.

5. The fan-out defined in claim 4, wherein N=1 or 2.

6. The fan-out defined in claim 5, wherein the plurality of fibers is either 24 or 48 fibers.

7. A fiber optic fan-out, comprising:
  a plurality of optical fibers;
  a first terminal attached to one end of the fibers, wherein the fibers are arranged in 2N rows, wherein N is an integer, said terminal having an alignment key;
  and N second terminals each with an alignment key, said second terminals attached to the opposite end of the fiber rows, the fibers being attached to the second terminals in two rows and retaining their consecutive relationship established at the first terminal, the order of the second terminals being in succession to the rows of the first terminal, the alignment keys of the second terminals all facing the same direction.

8. The fan-out defined in claim 7, wherein N=1 or 2.

* * * * *